United States Patent

Strother

[15] 3,638,618
[45] Feb. 1, 1972

[54] AUTOMATIC PET FEEDER

[72] Inventor: John Strother, 175 W. 137th St., New York, N.Y. 10030

[22] Filed: July 31, 1970

[21] Appl. No.: 60,074

[52] U.S. Cl. ........................................119/51.12, 119/51.5
[51] Int. Cl. .............................................................A01k 5/02
[58] Field of Search ......................119/51, 51.5, 51.11, 51.12, 119/51.13, 51.14

[56] References Cited

UNITED STATES PATENTS

| | | | |
|---|---|---|---|
| 3,491,723 | 1/1970 | Soukeras | 119/51.12 |
| 2,534,444 | 12/1950 | Hedwall et al. | 119/51.12 |
| 641,920 | 1/1900 | Askew | 119/51.12 X |
| 938,608 | 11/1909 | Roggensack | 119/51.15 |
| 1,022,309 | 4/1912 | Elliot | 119/51.12 |
| 1,274,845 | 8/1918 | Bird | 119/51.15 |
| 3,196,835 | 7/1965 | Bergevin | 119/51.11 |
| 3,450,101 | 6/1969 | Avrea | 119/51.11 |

Primary Examiner—Aldrich F. Medbery
Attorney—Victor J. Evans & Co.

[57] ABSTRACT

An automatic pet feeder controlled by a timer which releases a door to a feed compartment and simultaneously rings a bell to signal the pet that the door has been opened. A second door is released by the same timer at a later time for a second feeding also with a simultaneous ringing of the bell. A supply of water is released by the same timer simultaneously with the opening of one of the doors with the water supply being fed into one of the feeder dishes to moisten dry pet food at the time of its being made available to the pet.

1 Claims, 3 Drawing Figures

PATENTED FEB 1 1972  3,638,618

INVENTOR.
JOHN STROTHER
BY
Victor J. Evans & Co.
ATTORNEYS.

AUTOMATIC PET FEEDER

BACKGROUND OF THE INVENTION

1. Field of the Invention

The present invention relates to pet feeders which are automatically actuated at timed intervals.

2. Summary of the Invention

A pet feeder in which containers of pet food are positioned in a compartment and the compartment is closed with a spring-opened door and held in closed position by electric solenoids. A timer actuates the solenoids to permit the doors to open at timed intervals. Water is released from a third compartment to flow into one of the pet dishes to moisten the dry food contained therein. A bell is simultaneously actuated with the opening of the doors to signal the pet that he may have access to the food.

The primary object of the invention is to provide a pet feeder which will automatically give access to a pet to a meal and at a later time give access to the pet to a second meal with the pet being signaled as the meals become available.

Other objects and advantages will become apparent in the following specification when considered in the light of the attached drawings.

DESCRIPTION OF THE PREFERRED EMBODIMENT

Figure 1:
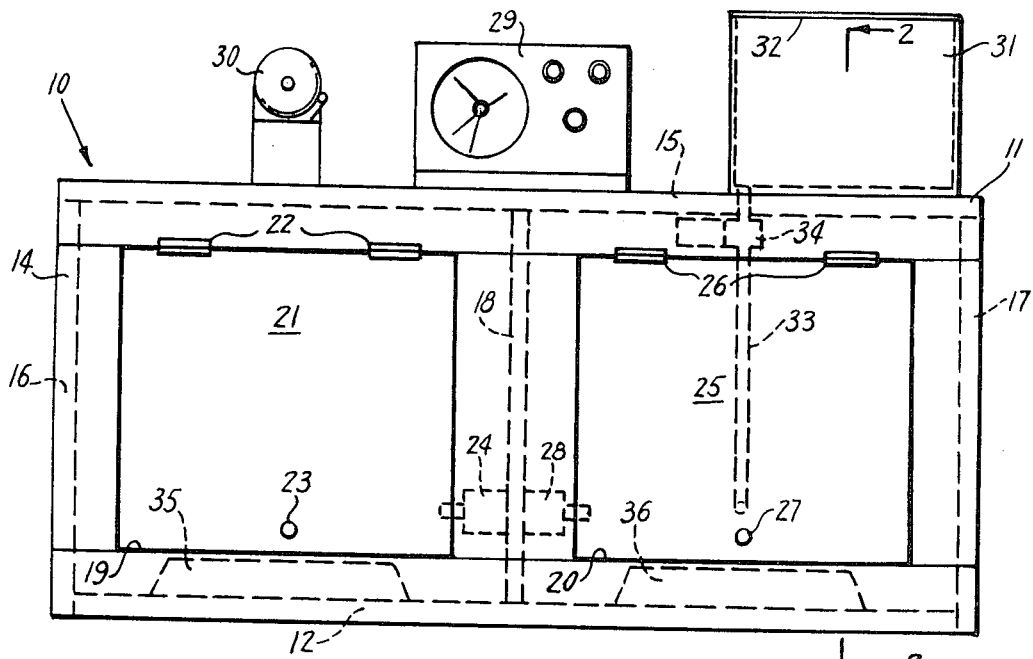
FIG. 1 is a front elevation of the invention.

Referring now to the drawings in detail wherein like reference characters indicate like parts throughout the several figures the reference numeral 10 indicates generally an automatic pet feeder constructed in accordance with the invention.

The pet feeder 10 includes a box 11 having a bottom wall 12, a backwall 13, a front wall 14, top wall 15, and a pair of oppositely disposed end walls 16, 17. The box 11 is divided into two compartments by a central partition 18 which is arranged intermediate and parallel to the end walls 16, 17. The front wall 14 has a generally rectangular opening 19 between the end wall 16 and the partition 18 and a second generally rectangular opening 20 between the end wall 17 and the partition 18.

A door 21 is secured in the opening 19 by a pair of spring hinges 22 secured along the top edge of the door 21. The spring hinges 22 normally urge the door 21 to a horizontal position. A knob 23 at the lower end of the door 21 is provided for pulling the door downwardly to closed position in the opening 19. A solenoid latch 24 is mounted on the partition 18 and normally secures the door 21 in its lower closed position.

Figures 2, 3:
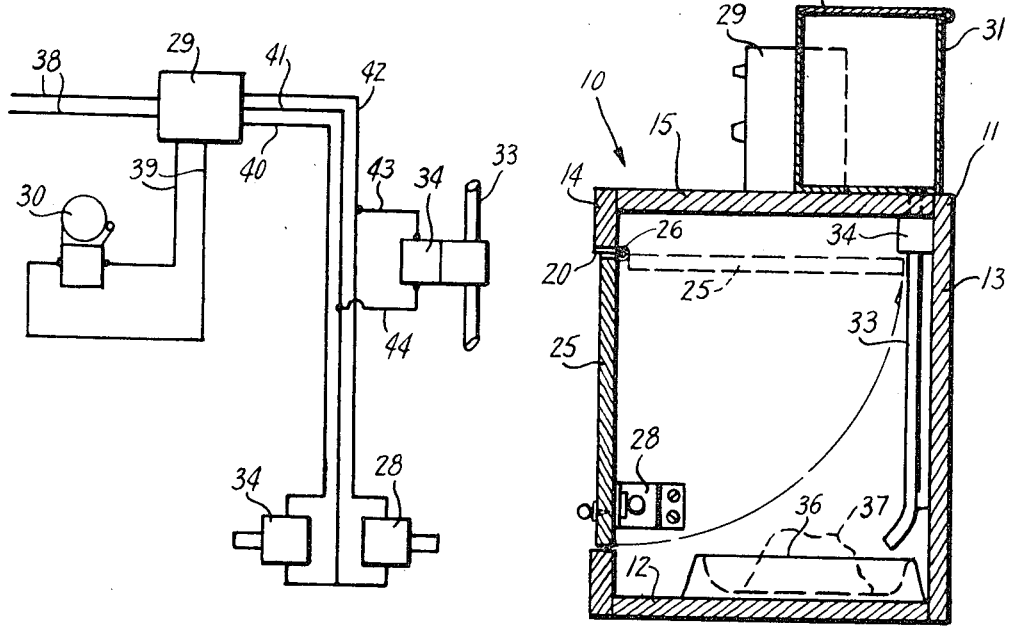
FIG. 2 is a vertical cross section taken along the line 2—2 of FIG. 1, looking in the direction of the arrows.
FIG. 3 is a wiring diagram of the circuits involved in the invention.

A door 25 is positioned in the opening 20 of the front wall 14 and is secured therein by a pair of spring hinges 26 secured along the upper edge of the door 25. The spring hinges 26 are identical to the spring hinges 22 and normally urge the door 25 upwardly to a horizontal position as illustrated in FIG. 2. A knob 27 is secured to the lower end of the outer face of the door 25 to move the door 25 to its closed position where it is latched by a solenoid latch 28 secured to the partition wall 18.

A timer 29 is mounted on the top wall 15 and a signal bell 30 is mounted on the top wall 15 adjacent the timer 29. A water tank 31 is mounted on the top wall 15 and provided with a hinged cover 32 which may be opened for filling the tank 31. A conduit 33 extends into the box 11 intermediate the end wall 17 and the partition 18 and is connected through a solenoid valve 34 to the tank 31.

A pet food dish 35 is positioned in the box 11 between the end wall 15 and the partition 18 behind the door 21. A second pet food dish 36 is positioned in the box 11 between the end wall 17 and the partition wall 18. The conduit 33 is arranged to discharge into the pet dish 36 to moisten dry dogfood 37 contained therein.

Referring now to FIG. 3 it should be noted that the timer 29 is connected to a source of electricity by a pair of wires 38. The timer 29 is also connected to the bell 30 by a pair of wires 39. A wire 40 extends from the timer 29 to one side of the solenoid latch 24 and a wire 41 extends to the other side of the solenoid latch 24 from the timer 29. The wire 41 also extends as a common wire to one side of the solenoid latch 28. A wire 42 extends from the timer 29 to the other side of the solenoid latch 28. A wire 43 extends from the wire 42 to one side of the solenoid valve 34 and a wire 44 extends from the common wire 41 to the other side of the solenoid valve 34.

In the use and operation of the invention when the pet is to be fed in the absence of its owner a meal is placed in the dish 35 and the timer 29 is set so that the latch 24 is actuated to release the door 21 and simultaneously the bell 30 is sounded to permit the pet to have access to the food in the dish 35. In the event that a second meal is required during the absence of the owner additional pet food is placed in the dish 36 and the timer 29 is set so that the solenoid latch 28 is actuated at a time beyond the time that the solenoid latch 24 is actuated, the bell 30 again being actuated simultaneously with the opening of the door 25. In the event that dry pet food is used in the dish 36 then water is placed in the tank 31 and this water is released by the actuation of the solenoid valve 34 simultaneously with the actuation of the solenoid latch 28. The water from the tank 31 moistens the food 37 in the dish 36 prior to it being eaten by the pet.

Having thus described the preferred embodiment of the invention it should be understood that numerous structural modifications and adaptations may be resorted to without departing from the spirit of the invention.

What is claimed is:

1. An automatic pet feeder comprising a box for enclosing and holding a dish of pet food, said box having an access opening to said dish, a door hingedly secured to said box normally closing said access opening, means spring biasing said door to open position inwardly of said box, a solenoid latch normally securing said door in closed position in said access opening, a water tank on said box, a water conduit extending from said tank to said dish, a solenoid valve normally closing said conduit, an audible electric signal on said box for indicating to a pet that the door is open, and an electric timer on said box to energize said solenoid latch to release said door, to simultaneously energize said solenoid valve to release water to flow from said tank to said dish and to simultaneously actuate said electric signal all at a predetermined preset time, said spring biasing means holding said door in open position until manually closed.

* * * * *